(12) United States Patent
Palakodeti

(10) Patent No.: US 7,575,434 B2
(45) Date of Patent: Aug. 18, 2009

(54) SURGERY PRACTICE KIT

(76) Inventor: Ratna K. Palakodeti, 438 Merrick Dr., Beavercreek, OH (US) 45434

( * ) Notice: Subject to any disclaimer, the term of this patent is extended or adjusted under 35 U.S.C. 154(b) by 486 days.

(21) Appl. No.: 11/461,524

(22) Filed: Aug. 1, 2006

(65) Prior Publication Data

US 2008/0032272 A1    Feb. 7, 2008

(51) Int. Cl.
*G09B 23/28* (2006.01)
(52) U.S. Cl. .................................................. 434/267
(58) Field of Classification Search ................ 434/262, 434/267, 272, 273, 275, 295, 296
See application file for complete search history.

(56) References Cited

U.S. PATENT DOCUMENTS

| | | | | |
|---|---|---|---|---|
| 3,339,290 | A * | 9/1967 | Doyle | 434/267 |
| 4,001,951 | A * | 1/1977 | Fasse | 434/267 |
| 4,134,218 | A * | 1/1979 | Adams et al. | 434/267 |
| 4,386,917 | A | 6/1983 | Forrest | |
| 4,481,001 | A | 11/1984 | Graham et al. | |
| 4,789,340 | A | 12/1988 | Zikria | |
| 4,867,686 | A * | 9/1989 | Goldstein | 434/267 |
| D326,112 | S | 5/1992 | Zikria | |
| 5,310,348 | A | 5/1994 | Miller | |
| 5,672,058 | A * | 9/1997 | Casement et al. | 434/267 |
| 5,752,948 | A * | 5/1998 | Tankovich et al. | 606/9 |
| 5,775,916 | A | 7/1998 | Cooper et al. | |
| 5,803,746 | A | 9/1998 | Barrie et al. | |
| 6,083,008 | A * | 7/2000 | Yamada et al. | 434/267 |
| 6,336,812 | B1 | 1/2002 | Cooper et al. | |
| 6,398,557 | B1 | 6/2002 | Hoballah | |
| 6,854,976 | B1 * | 2/2005 | Suhr | 434/273 |
| 7,419,376 | B2 * | 9/2008 | Sarvazyan et al. | 434/273 |

FOREIGN PATENT DOCUMENTS

WO    WO 2004/003873 A2    1/2004

* cited by examiner

*Primary Examiner*—Kurt Fernstrom
(74) *Attorney, Agent, or Firm*—Hasse & Nesbitt LLC; Donald E. Hasse

(57) ABSTRACT

A simple to use, inexpensive and readily portable surgical practice and teaching kit is described that includes in portfolio form a two layer practice suturing pad including a latex rubber layer simulating human skin attached to a plastic foam layer that simulates underlying human tissue, the foam layer having incorporated therein simulated subcutaneous growths or lesions such as simulated lipomas or sebaceous cysts. The practice pad is mounted on a folder or portfolio for convenient access and use by the student or practitioner, the portfolio also including pictorial illustrations showing various proper suturing techniques as a visual guide to the user in practicing suturing procedures.

15 Claims, 1 Drawing Sheet

SURGERY PRACTICE KIT

FIELD OF INVENTION

The present invention relates generally to medical training devices, and more particularly to a medical training portfolio containing a surgery practice kit including materials for simulating skin, tissue and subcutaneous growths or structures and instructions for practice in excising the growths or structures and for suturing the incisions in the simulated skin and tissue.

BACKGROUND OF THE INVENTION

Students of the medical or veterinary arts as well as experienced medical practitioners need to maintain proficiencies or to learn new procedures in the practice of surgical and suturing techniques and methods of doing skin biopsies and excision of subcutaneous growths or structures. The surgical procedures require substantial practice before a medical student or practitioner can safely and effectively perform the procedures on a patient. Teaching aids existing in the applicable art areas for practicing suturing procedures may be represented by those described in or referenced by U.S. Pat. No. 4,386,917 to Forrest, describing a suturing training device and method utilizing a multilayer material simulating human tissue, by U.S. Pat. No. 5,310,348 to Miller, describing a surgical suture demonstration kit for use in practicing various surgical sutures, by U.S. Pat. No. 4,481,001 to Graham et al, describing a skin model for practicing intradermal injection of fluids, or by U.S. Pat. No. 4,789,340 to Zikria, describing a surgical student teaching aid for practicing various surgical techniques.

Practicing suturing and removal of lesions such as lipomas, sebaceous cysts, or other subcutaneous growths and performing various minor surgical procedures are fundamental practices in the training of medical or veterinary students and in the practice of various other medical procedures by students or experienced practitioners. Surgery or suturing practice techniques presently in use as exemplified by the patents just described or those referenced therein or other known techniques suffer various inadequacies or deficiencies that render them of limited usefulness or desirability for use. For example, pigs legs or cadavers have been used and are presently in use for practicing suturing techniques by medical students and experienced practitioners. However, these materials, being biological, require proper storage to avoid degrading and therefore have limited usefulness except for short, well controlled demonstrations, and, further, have associated therewith various objections to use for social or religious reasons. Surgery or suturing teaching materials such as those described or referenced in the prior art provide the student with limited variety of suture practice and excision examples exemplary of those that the student would encounter repeatedly in practice, are generally bulky and cumbersome in use, are extremely costly, are not sufficiently portable to provide the student the option of practicing at all convenient times and places, fail to provide adequate pictorial, instructional and reference materials for various suturing techniques, and are structured as to preclude ease of storage and retrieval of notes or reference materials.

There is, therefore, a long standing need for a simple to use, inexpensive and easily portable surgery practice kit on which the user/student/practitioner can practice various incision and suturing techniques and can practice the removal of lesions such as lipomas, sebaceous cysts or other subcutaneous growths or structures.

SUMMARY OF THE INVENTION

The present invention solves or substantially reduces in critical importance problems with prior art surgery or suturing practice materials by providing a simple to use, inexpensive and readily portable surgical practice and teaching kit that includes in portfolio form a two layer practice suturing pad including a latex rubber layer simulating human skin attached to a plastic foam layer that simulates underlying human tissue, the foam layer having incorporated therein simulated subcutaneous growths or lesions such as simulated lipomas or sebaceous cysts. The practice pad is mounted on a folder or portfolio for convenient access and use by the student or practitioner, the portfolio also including pictorial illustrations showing various proper suturing techniques as a visual guide to the user in practicing suturing procedures.

In one aspect of the invention, therefore, a surgical practice and teaching kit is described that realistically simulates a broad range for excising and suturing scenarios for practice by the medical student or experienced practitioner, and comprises:

(a) a practice suturing pad for simulating human skin and underlying tissue, said pad including a foam layer having upper and lower surfaces and a latex rubber sheet adhesively attached in laminar contact to said upper surface of said foam layer;

(b) a supporting panel, said foam layer attached at said lower surface thereof to said supporting panel;

(c) a plurality of simulated growths disposed beneath said foam layer between said lower surface of said foam and said supporting panel; and (d) a plurality of cavities formed in said foam layer, and a simulated growth disposed within each of said cavities in said foam layer.

The invention also relates to a surgery practice kit that includes:

(a) a portfolio having a back panel and a cover panel;

(b) a practice suturing pad for simulating human skin and underlying tissue, said pad including a foam layer having upper and lower surfaces and a latex rubber sheet adhesively attached in laminar contact to said upper surface of said foam layer, said foam layer attached at said lower surface thereof to one of said back panel or said cover panel of said portfolio;

(c) a plurality of simulated growths disposed beneath said foam layer between said lower surface of said foam and said one of said back panel or said cover panel of said portfolio; and (d) a plurality of cavities formed in said foam layer, and a simulated growth disposed within each of said cavities in said foam layer.

An advantage of the present invention is that the user may practice suturing techniques simulating numerous scenarios that can be encountered during actual surgical procedures.

Another advantage of the present invention is that the surgery practice pad in the structure of the practice kit closely simulates actual human skin and underlying tissue allowing meaningful practice materials for the medical student or experienced practitioner in excising subcutaneous growths, doing skin biopsies and performing both surface and deep tissue suturing.

The surgery practice and teaching kit described herein is inexpensive and lightweight, is of convenient size for ease of portability in a briefcase, backpack or the like, and provides space for storage of notes and instructional materials, and, being in portfolio or folder form, can be easily stored on a bookshelf or in a filing cabinet along with other books and files.

The present invention further has the advantage of including within the supporting portfolio pictorial and/or written instructions for doing proper incisions, excising cutaneous and subcutaneous structures, and performing skin biopsy techniques and suturing techniques, and including a storage pocket for containing and preserving notes of the user.

These and other objects, benefits and advantages of the invention will become apparent as the detailed description of representative embodiments thereof proceeds.

BRIEF DESCRIPTION OF THE DRAWINGS

The invention will be more clearly understood from the following detailed written description of representative embodiments thereof read in conjunction with the accompanying drawings that form a part of this disclosure, and wherein.

DETAILED DESCRIPTION OF THE INVENTION

Figure 1:
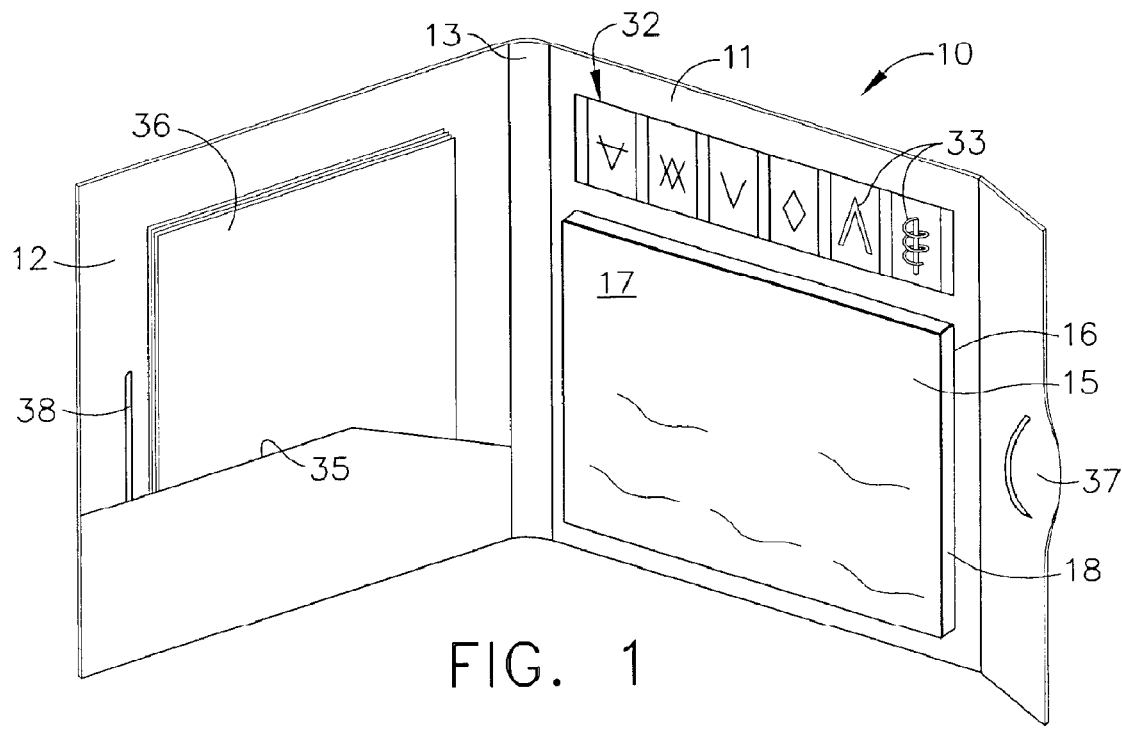
FIG. 1 is a perspective view of one representative embodiment of the invention in convenient portfolio form.

Referring now to the drawings, FIG. 1 shows a perspective view of one representative embodiment of the invention comprising a portfolio 10 that optionally includes a backing sheet or panel 11 and cover panel 12 hingedly interconnected as at 13 for closure in portfolio, folder or book form, such as characterizes a commercially available A4 folder or the like. Backing panel 11 and cover panel 12 may be any suitable material as would occur to the skilled artisan practicing the invention such as flexible plastic material, cardboard, wood, or the like, the specific material or folder structure selected not being considered limiting of the invention. A surgical suturing practice pad 15 is supported by any convenient means, such as adhesively, on one of the panels 11,12 for access by the user in practicing the art of excising subcutaneous growths and of suturing the incisions so made in excising the growths. Alternatively, pad 15 can be attached to a separate panel member 16, which is then attached to a surface of portfolio 10 such as suggested in FIG. 1.

Figure 2:
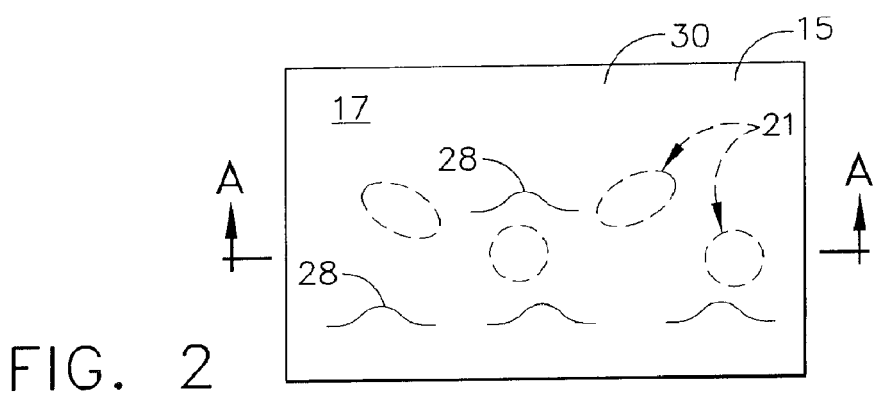
FIG. 2 is a plan view of the suturing practice pad included in the portfolio illustrated in FIG. 1.
Figure 3:
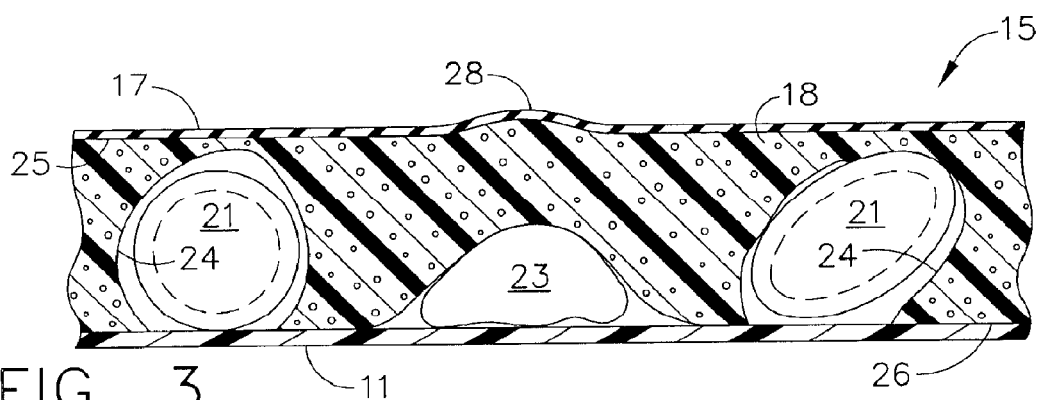
FIG. 3 is an enlarged partial sectional view along lines A-A of FIG. 2 illustrating various simulated subcutaneous growths included in the pad structure for excising and suturing practice by the student or practitioner.

Referring now to FIG. 2 and FIG. 3 in conjunction with FIG. 1, it is seen that FIG. 2 shows a plan view of pad 15 and FIG. 3 is an enlarged cross sectional view of pad 15 such as taken along lines A-A of FIG. 2. Pad 15 comprises a first latex rubber layer 17 attached in laminar fashion to an upper surface 25 of a supporting foam layer 18. Layer 17 of latex rubber may have a thickness of about 0.004 to 0.006 inch and exhibits the feel and consistency and cuts in manner that closely simulates human skin. Layer 18 can have thickness in the range of about ½ inch to about one inch, and may comprise plastic foam of selected density. For the purposes served herein in accordance with the invention, layer 18 can comprise polyurethane foam with a density of about 1.2 to about 3.0 pounds per cubic foot with an indentation load deflection of about 25 to 55 pounds. The selected thickness for layer 18 closely simulates actual tissue depth and the selected foam material and consistency allows for deep suturing practice without the foam crumbling (crumbling of the foam has been a problem in prior art structures). Layer 17 is attached to layer 18 with any suitable flexible adhesive, such as 3M Contact Adhesive 80, Scotch Grip 2141 or comparable commercially available adhesive, the specific adhesive selected by one practicing the invention not considered limiting of the invention or of the appended claims.

Practice pad 15 in the figures includes within the structure of foam layer 18 and beneath simulated skin layer 17 a plurality of simulated sebaceous cysts 21 and lipomas 23 for practice in the excising of subcutaneous growths or lesions. The simulated sebaceous cysts 21 can comprise soft round or oval shaped grape sized plastic balls, commercially available, that can be hollow or filled with matter emulating the contents of naturally occurring sebaceous cysts The simulated cysts 21 are disposed within foam layer 18 inside holes 24 formed in layer 18 so that the simulated cysts 21 are imbedded within layer 18 substantially immediately beneath the latex simulated skin layer 17, and may be loosely adhesively attached within the holes 24 in foam layer 18. The position for the simulated cysts 21 just below the skin closely imitates the position that cysts would naturally appear within otherwise normal human tissue.

Simulated lipomas 23 can comprise foam pieces of substantially the same consistency as the foam layer 18 formed into an irregular shape up to about ½ inch to one inch in size using an adhesive or other material to form the foam pieces into the desired shape. Lipomas typically appear deep within the human tissue. Therefore, simulated lipomas 23 are placed beneath foam layer 18 and can be loosely adhered to the back panel 11 of portfolio 10 or to the bottom surface 26 of layer 18. Placement of simulated lipomas 23 as just described results in the raised areas 28 appearing in the figures in simulated skin layer 17 and simulated tissue layer 18 that closely imitates the natural position and outward appearance of a lipoma in human tissue.

It is noted without limitation of the teachings herein presented or of the claims hereto appended that numerous such simulated growths in the form of simulated cysts 21 and lipomas 23 may be distributed throughout or beneath foam layer 18 of pad 15. Surface areas 30, such as the top portion of pad 15 or areas between the positions of the simulated cysts and lipomas may be reserved for practicing simple incision and suturing techniques and stitching of flap lacerations and punch biopsies without excising simulated subcutaneous growths.

Portfolio 10 may include, also without limitation of the teachings herein, a quick reference pictorial instruction panel 32 exhibiting one or more illustrations 33 of individual suturing techniques. Also optionally included in the structure of portfolio 10 is a pocket 35 usable for storage of instructional materials 36 or the like describing surgical techniques that can be practiced using the invention. Closure means for portfolio 10 can be provided in the form of flap 37 in the back panel 11 and slit 38 in the front panel 12 or in the form of other conventional closure means (not shown), such as an elastic band, snaps, or the like, the same not considered limiting of the invention herein.

The invention therefore provides a surgery practice and teaching kit including a practice pad simulating human skin and underlying tissue including simulated subcutaneous growths for use by a student or practitioner in practicing excision and suturing techniques. It is understood that modifications to the invention may be made as might occur to one with skill in the field of the invention within the scope of the appended claims. All embodiments contemplated hereunder that achieve the benefits of the invention have therefore not been shown in complete detail. Other embodiments may be developed without departing from the spirit of the invention or from the scope of the appended claims.

I claim:
1. A surgery practice kit, comprising:
   (a) a practice suturing pad for simulating human skin and underlying tissue, said pad including a foam layer having upper and lower surfaces and a latex rubber sheet adhesively attached in laminar contact to said upper surface of said foam layer;
   (b) a supporting panel, said foam layer attached at said lower surface thereof to said supporting panel;
   (c) a plurality of simulated growths disposed beneath said foam layer between said lower surface of said foam and said supporting panel; and
   (d) a plurality of cavities formed in said foam layer, and a simulated growth disposed within each of said cavities in said foam layer.
2. surgery practice kit of claim 1 wherein said foam layer comprises polyurethane foam.
3. The surgery practice kit of claim 2 wherein said foam layer is one-half inch to one inch in thickness.
4. The surgery practice kit of claim 1 wherein said simulated growths comprise clumps of plastic material or plastic balls of one-half inch to one inch in size.
5. The surgery practice kit of claim 4 wherein said simulated growths comprise plastic pieces sized and structured to simulate subcutaneous growths, lesions, lipomas or cysts.
6. The surgery practice kit of claim 1 wherein said supporting panel comprises a sheet of plastic, wood or cardboard.
7. The surgery practice kit of claim 1 further comprising a pictorial reference panel disposed on said supporting panel near said pad, said reference panel including one or more illustrations instructive of proper suturing procedures.
8. A surgery practice kit, comprising:
   (a) a portfolio having a back panel and a cover panel;
   (b) a practice suturing pad for simulating human skin and underlying tissue, said pad including a foam layer having upper and lower surfaces and a latex rubber sheet adhesively attached in laminar contact to said upper surface of said foam layer, said foam layer attached at said lower surface thereof to one of said back panel or said cover panel of said portfolio;
   (c) a plurality of simulated growths disposed beneath said foam layer between said lower surface of said foam and said one of said back panel or said cover panel of said portfolio; and
   (d) a plurality of cavities formed in said foam layer, and a simulated growth disposed within each of said cavities in said foam layer.
9. The surgery practice kit of claim 8 further comprising a supporting panel for said foam layer, said supporting panel attached to said one of said back panel or said cover panel of said portfolio.
10. The surgery practice kit of claim 8 wherein said foam layer comprises polyurethane foam.
11. The surgery practice kit of claim 10 wherein said foam layer is one-half inch to one inch in thickness.
12. The surgery practice kit of claim 8 wherein said simulated growths comprise clumps of plastic material or plastic balls of one-half inch to one inch in size.
13. The surgery practice kit of claim 12 wherein said simulated growths comprise plastic pieces sized and structured to simulate subcutaneous growths, lesions, lipomas or cysts.
14. The surgery practice kit of claim 8 wherein said supporting panel comprises a sheet of plastic, wood or cardboard.
15. The surgery practice kit of claim 8 further comprising a pictorial reference panel disposed on said one of said back panel or said cover panel of said portfolio near said pad, said reference panel including one or more illustrations instructive of proper suturing procedures.

* * * * *